US008988020B1

(12) United States Patent
Rometo

(10) Patent No.: US 8,988,020 B1
(45) Date of Patent: *Mar. 24, 2015

(54) MOTOR OPERATOR SYSTEM FOR A POWER SWITCH WITH TRAVEL SET WITH THREE POSITIONS FOR GROUND OR DOUBLE-THROW TYPE SWITCH

(71) Applicant: Angelo Rometo, North Huntingdon, PA (US)

(72) Inventor: Angelo Rometo, North Huntingdon, PA (US)

(73) Assignee: Cleaveland/Price, Inc., Trafford, PA (US)

( * ) Notice: Subject to any disclaimer, the term of this patent is extended or adjusted under 35 U.S.C. 154(b) by 149 days.

This patent is subject to a terminal disclaimer.

(21) Appl. No.: 13/795,950

(22) Filed: Mar. 12, 2013

(51) Int. Cl.
*H02P 1/00* (2006.01)
*H01H 71/70* (2006.01)

(52) U.S. Cl.
CPC .................................... *H01H 71/70* (2013.01)
USPC ............................ 318/268; 318/469; 318/439

(58) Field of Classification Search
USPC .................................. 318/460, 268, 469, 439
See application file for complete search history.

(56) References Cited

U.S. PATENT DOCUMENTS

| | | | | |
|---|---|---|---|---|
| 5,552,647 | A | 9/1996 | Tinkham | |
| 6,025,657 | A | 2/2000 | Lo et al. | |
| 6,215,263 | B1 | 4/2001 | Berkowitz et al. | |
| 6,592,412 | B1 * | 7/2003 | Geil et al. | 440/6 |
| 7,122,986 | B1 | 10/2006 | Willard et al. | |

OTHER PUBLICATIONS

Cleaveland/Price Inc. Bulletin DB32CO4 "UAD UAD-V Controller and Motor Assmebly for Underground Switches", (6 Pages), 2004.

* cited by examiner

*Primary Examiner* — Karen Masih
(74) *Attorney, Agent, or Firm* — Ronald S. Lombard

(57) ABSTRACT

A motor operator system for a power switch which allows electrical motor operation to the GROUND POSITION via TRAVEL SET electronics to ensure personnel safety by accomplishing travel setting without a person entering an underground vault but also allows operation to the ground position manually if so desired. The motor operator system of the present invention includes a position switch panel that allows a three position set travel with travel adjust function. The three positions are CLOSE, OPEN, GROUND, or, alternatively, CLOSE, OPEN, CLOSE.

15 Claims, 11 Drawing Sheets

MOTOR OPERATOR SYSTEM FOR A POWER SWITCH WITH TRAVEL SET WITH THREE POSITIONS FOR GROUND OR DOUBLE-THROW TYPE SWITCH

BACKGROUND OF THE INVENTION

The invention relates to motor operators, such as for power switches of electrical utilities, and particularly to such operators for underground switches as well as switches in other locations, with a drive and control system that allows adjustment of motor travel settings resulting in the proper travel of the power switch.

Power switches, for example, disconnect and load break switches for distribution systems, are typically used in three main types of locations: overhead on a utility pole, in an underground vault, and pad mounted substantially at surface level. (Reference to "pad" or "pad mounted" herein, unless the context clearly indicates the contrary, is to be understood as mounted on an above ground pad.) It is of course the case that these switches can sometimes be mounted on a pad instead of being under ground. The switches can also be of different types. Unenclosed air break switches are often used on pole top installations. Enclosed, but not sealed, air break switches are often used at pad mounted installations. Enclosed and sealed switches, such as with vacuum or gas (e.g., SF6) insulation, are often used on or in locations, such as underground vaults, where the confined and sometimes flooded space makes air break switches inappropriate.

Switches in underground locations, and also in some pad installations, have motor operators located near the switches (in contrast, for example, to pole top air break switches that are mechanically coupled to motor operators on or near the ground). At one time power switches could be operated only by direct access to the switch or its operator. More recently, the power switch art has applied technology for remote, automated operation of a motor operator to close and open a power switch, (see, for example, Cleaveland/Price Bulletin DB-32BC04 (of 2004). During installation, however, the motor operator will need travel adjustment at the motor operator itself in order to operate the switch with the complete open or close position travel, which can be accomplished as disclosed in U.S. Pat. No. 7,122,986, issued on Oct. 17, 2006, to the present assignee, Cleaveland/Price Inc., said patent herein incorporated by reference in its entirety.

Extra danger to utility workers is encountered in tight locations such as underground vaults. For example, an enclosed switch may explode, due to heat buildup from arcing during a malfunction of the switch, subjecting workers to injury.

Motor operators for underground switch locations generally require a sealed enclosure to protect the operator from common flooding of the vault. For access to the interior of the enclosure for any reason, it has been necessary to have a port or panel of the enclosure that is removable and replaceable at the service location by a worker. In addition to the time needed to access the interior and to reseal the motor operator properly, perhaps dealing with up to thirty fasteners and a gasket, there is a risk the attempt to reseal is not successful and can lead to malfunction of the unit. The worker performing the field work is not equipped to test whether the seal is effective. Therefore, there is a need in the industry to adjust the travel of a sealed motor operator without disturbing the seal of the enclosure.

Generally, in the past, underground motor operators, required adjustment at the motor operator-power switch location to set the limits of travel of the motor in the motor operator which determine the travel limits of the power switch. This required accessing inside the sealed enclosure. For proper operation the motor drive unit (i.e., the motor itself and related gearing) needs to be able to move the power switch contacts to a definite closed position or a definite open position which requires adjustment of motor travel.

For final adjustment during installation and occasional readjustment over the life of the equipment, in the case of an underground switch, a worker would have to enter the vault where the switch and motor operator are located. Typically, limit switches to control the limits of travel of the motor operating shaft would need setting upon initial installation of the operator and switch and possible adjusting from time to time of the installation. The limit switches would have to be accessed by opening the enclosure containing the motor resulting in the risks mentioned above in the case of underground units, including at least at the risk to the integrity of the enclosure seal. While other locations, such as pad mounted at ground level, do not involve quite the same concerns for worker safety and motor operator integrity, the need for accessing the limit switches is at least an undesirable maintenance requirement.

Motor operators have been used or proposed having a switch actuator with a position-sensing feature between an output shaft of the motor of the operator and a lever that produces power switch opening and closing, for example, as in U.S. Pat. No. 5,552,647 issued to Ronald B. Tinkham on Sep. 3, 1996. Position sensing is shown by a potentiometer responsive to movement of a linear actuator to generate a signal indicating a position of a reference element on the actuator. The signal generated is communicated to control circuitry. The circuitry compares the signal to a standard to determine if the actuator travel is within limits determined by adjustable open-limit and closed-limit potentiometers. The arrangement is intended to improve on the prior limit switch assemblies which fail to provide sufficient accuracy and repeatability and tend to be complicated and costly. Such an actuator control is not one that avoids need for adjustment in the motor operator enclosure. The enclosure has an access hole specifically for adjustment of the open-limit potentiometer and the close-limit potentiometer. This adjustment requires a worker to enter the underground vault.

Other motor operators have been disclosed that also have a sensed position signal. U.S. Pat. No. 6,025,657, Feb. 15, 2000, is directed to a motor operator for either power on or manual operation without need for any decoupling or mode selection with a control system that receives signals indicating both the position of the drive output and the current drawn by the drive source. U.S. Pat. No. 6,215,263, Apr. 10, 2001, discloses a motor operator for overhead air break switches with a microcontroller subject to a variety of signals, including a position signal developed by a sensor that is a type of encoder. Some of the parameters relied on are temperature sensitive and require compensation. Some types of shaft position sensors, for example, including some encoders, depend on continuous power for a position signal to be reliably generated. Otherwise, after a power outage, the actual switch position would need to be observed and the motor travel limits reset. Such motor operators did not particularly address and respond to a need in the power switch art for avoiding needed travel limit adjustments in the enclosure of the motor, particularly important in underground sealed units.

As mentioned such motor operators will often need some adjustment at the motor operator itself in the case of a power switch having an open position and a dosed position, as disclosed in the aforesaid U.S. Pat. No. 7,122,986 B1. This patent discloses a power switch motor operator system which includes a first enclosure housing a motor with a motor shaft, a gear train running on the motor shaft, and an output shaft from the gear train having an end extending from the first enclosure to a movable contact of a power switch. A second enclosure is provided for containing a power supply and control assembly and a position switch panel that electrically communicates with the power supply and control assembly and includes switches for setting and adjusting travel limits for the motor shaft for the open switch position and the closed switch position using the signal from a potentiometer without requiring access to the first enclosure.

There has been a longstanding safety issue in the electric utility industry related to enclosed high voltage switch vaults and the need to operate the switch (without a person entering the vault) to a position which grounds the power circuit. The safest configuration for the vault mount switches is a GROUND position in addition to the OPEN and CLOSE positions. The GROUND position allows for the associated high voltage line to be grounded instead of merely open circuited. A grounded line assures the utility that any switching errors elsewhere on the system will not allow any voltage on the line that can injure or kill utility personnel. Additionally switch explosions in the vault caused by malfunctioning switch gear represent a fatal risk to any personnel in the vault. Currently in order to operate a power switch to the GROUND position requires electric utility personnel to enter the vault to perform the switching or the utility requires a complicated rope and pulley system to manually operate the switchgear to GROUND. Therefore it is an object of this invention to develop a power switch motor operator system that permits operation to and from the GROUND POSITION by remote electrical (non-manual) operation without the need for electric utility personnel to enter the vault or the need for a complicated rope and pulley system to manually operate the switchgear to GROUND.

SUMMARY OF THE INVENTION

The present invention provides a motor operator system for a power switch which allows electrical motor operation to the GROUND POSITION via TRAVEL SET electronics to ensure personnel safety but also allows operation to the ground position manually if so desired. The motor operator system of the present invention includes a position switch panel that allows a three position set travel with travel adjust function. The three positions are CLOSE, OPEN, and GROUND, or as an alternative arrangement, CLOSE OPEN CLOSE.

The power switch motor operating system includes switches and indication for selectively directing and adjusting the motor and power switch to a CLOSE position, OPEN position, and GROUND position or, in an alternative, a CLOSE position, OPEN position, and CLOSE position. This novel approach is accomplished by the position switch panel initiating clockwise or counterclockwise rotation of the motor based on the present position of the motor and recording the three positions utilizing a programmed microcontroller that has or is connected in circuit with a memory element. The CLOSE, OPEN, CLOSE switch configuration adapts the control electronics to allow for control of an auto-transfer style power switch that can feed power from one source to two loads or, alternatively, from two sources to one load.

In order to set positions, the present invention provides a combination of buttons of the position switch panel to be used to indicate to the electronics that a particular voltage that is developed by the potentiometer housed in the first enclosure is the desired set point. As with the power switch motor operating system disclosed in the above-mentioned U.S. Pat. No. 7,122,986 B1, a first enclosure, for example, houses a motor with a gear train for driving a shaft coupled to a power switch, which can be adjacent to it in an underground vault, with also a position sensor such as a potentiometer; preferably, a rotary potentiometer in the first enclosure that runs off the motor shaft. The rotary potentiometer (or "pot", for simplicity) develops a voltage signal indicating the rotary position of the motor shaft. The motor operator system has a second enclosure for power supply and control elements that, in the case of an underground switch, is much more accessible, such as being at surface level, rather than the enclosure in the underground vault. The second enclosure can provide various automation functions, such as for remote switch operation via a radio and RTU, and also provide for local operation at the second enclosure.

The position signal from the pot is communicated to the microcontroller in the second enclosure that has or is connected in circuit with a nonvolatile memory for storing motor travel limits. A worker at the second enclosure can perform various functions at the second enclosure while merely observing or hearing the switch open or close or go to GROUND, such as through a manhole without the need to enter the vault where the switch and the first enclosure have been installed. Furthermore, even after total power outage, including lack of any back-up battery power, when the pot is re-energized an accurate signal of the present switch position is given to the controller.

With the use of the switch panel of the present invention in the second enclosure that receives the position signals, the worker can open or close or set to GROUND the switch, set an existing position as a set point, and adjust the set points of travel such that the motor moves between OPEN, CLOSE, GROUND, or, in the alternative, CLOSE, OPEN, CLOSE switch positions. Software running on the microcontroller controls all of these user functions. Simply using the position signal while selectively running the motor fully on for travel in the OPEN, CLOSE, GROUND, or CLOSE, OPEN, CLOSE direction allows a worker to set or adjust travel limits accurately. The only needed signal from the motor to the microcontroller is the shaft position signal.

These and other aspects of the present invention will be additionally illustrated and described in the accompanying drawings and the following text.

DETAILED DESCRIPTION OF THE INVENTION

Figure 1:
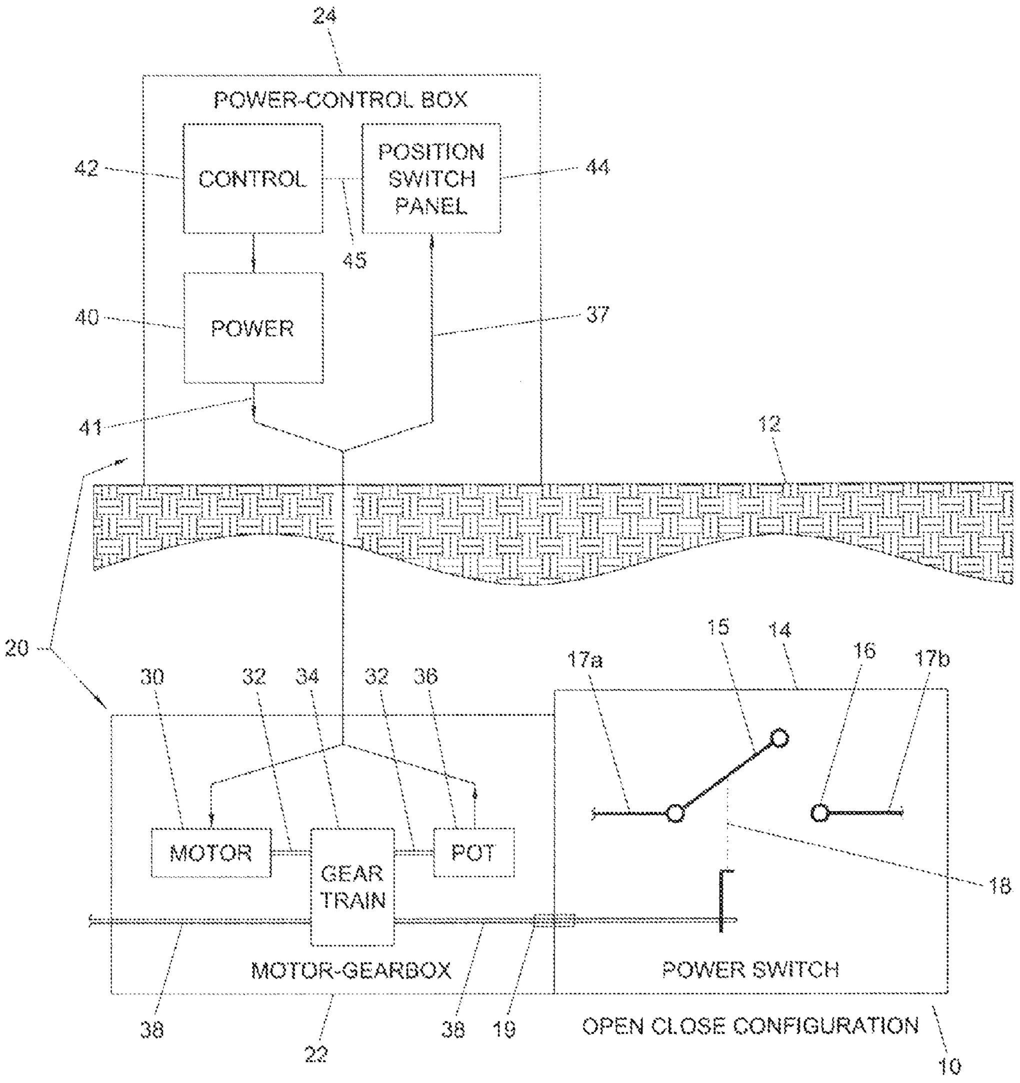
FIG. 1 is a schematic block diagram of a motor operator system, with an underground power switch, showing an OPEN-CLOSE CONFIGURATION of the power switch according to the above-referenced U.S. Pat. No. 7,122,986 B1.

Referring to FIG. 1, a power switch 10 and a motor operator system 20 are shown for an underground installation. The power switch configuration shown in FIG. 1 is of the type described in the above-mentioned U.S. Pat. No. 7,122,986 B1 (hereinafter referred to "old switch configuration"). The switch 10, in first enclosure 22, is below ground level 12, typically in an underground concrete vault (not shown) with a manhole for access. The first enclosure 22 may sometimes be referred to herein as the motor-gearbox. A second enclosure 24, is located at or above ground level 12. The second enclosure 24 may sometimes be referred to herein as the power and control box.

Figure 2:
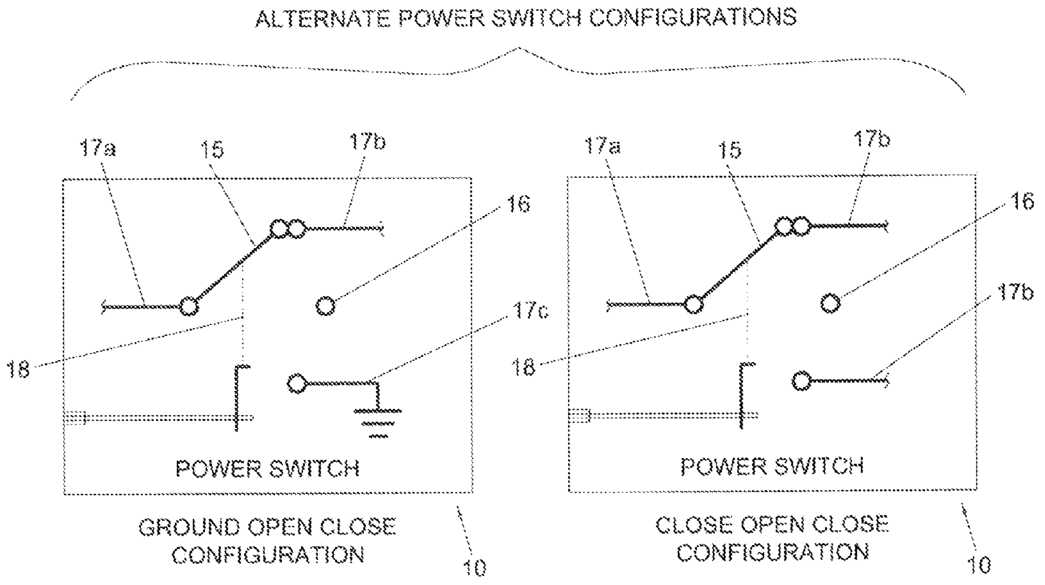
FIG. 2 is a schematic block diagram showing alternate power switch configurations of GROUND-OPEN-CLOSE and CLOSE-OPEN-CLOSE of the present invention with reference to FIG. 1.

The old switch configuration power switch 10 included an enclosure 14 containing switch contacts 15 and 16 at least one of which, 15, is movable relative to the other, 16, a shown in FIG. 1. Switch 10 is, for example, a vacuum or gas insulated switch of prior art construction. Segments 17*a* and 17*b* of one phase of a power line are connected to the respective contacts 15 and 16. (FIG. 1 is to be taken as schematic for other arrangements including usually a power switch 10 with a set of contacts for each phase of a three-phase distribution system, all operable by a single motor operator). A movable contact 15 is mechanically coupled at a coupler or decoupler 19 via an undetailed operating mechanism 18, to a shaft 38 from enclosure 22. In FIG. 2 alternate configurations for the power switch 10 relating to the present invention are shown. The difference from the old configuration switch is an additional switch point has been added; the first switch point connecting to segment 17*b* of a power line; the second switch point at 16 being OPEN; and, the third switch point connecting to segment 17*c* which may be to GROUND or to another power line. The mechanism 18 and contacts 15 and 16 can be arranged in any way, including those presently practiced, for operation by the output force of the motor operator system 20 including, for example, torsional and reciprocating versions. The mechanism 18 typically includes an energy storing element (e.g., a spring) that is loaded to a trigger point by the motor 30 actual switch contact movement occurs. A switch operation on release of the spring makes enough sound to be easily heard above ground.

Figure 4:
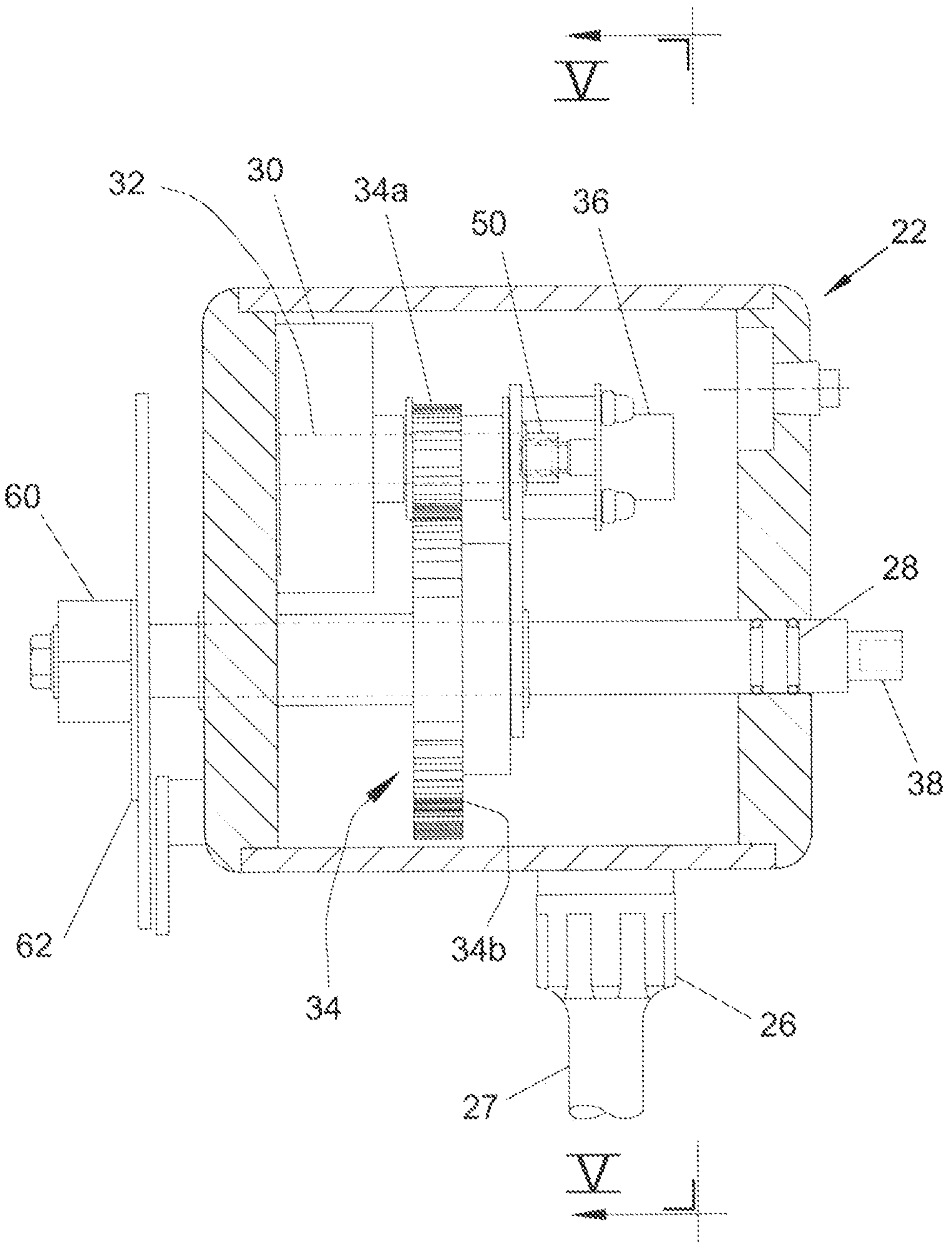
FIG. 4 is a side elevation view, partly in section and partly broken away, of one form of a motor-gearbox applicable to the present invention.

Referring to FIG. 4, in enclosure 22, there is shown a motor 30 with an output shaft 32. A gear unit or gear train 34 and a rotary potentiometer 36 (sometimes referred to herein simply as the pot) are coupled with, and run off of, the shaft 32. Through shaft 32 and gear unit 34, the motor 30 drives the motor-gearbox output shaft 38 that goes to switch mechanism 18. Of course other mechanisms besides a gear unit or gear train 34 are feasible for driving the gearbox output shaft 38.

To help keep the terminology used in this description clear, the following is intended unless the context shows a different intent: The expression "motor-gearbox" refers to the whole of enclosure or box 22. The "motor" in the enclosure 22, likely to be a procured item for use by the maker of the system 20, may (or may not) happen to have a gear or gears within the same enclosure 30 with an actual electric motor. In the case of an example motor 30 in the more specific embodiment of FIG. 4, such gears are present. The "motor 30" means the motor unit 30 including the motor with whatever gears are also present in the unit. The "motor shaft" 32 is the output shaft from the motor unit 30, whether it is directly from a motor or is located to rotate as a result of gears in the unit 30. The expression "gear train" or "gear unit" 34, or the like, will refer to any one or more gears within the motor-gearbox 22 that are between the output shaft 32 at the motor 30 and the output shaft 38 of the box 22. The expression "motor drive" may be used to encompass a combination of a motor, with gears (if any) either in a motor unit 30 or gear train 34 and an output mechanism such as the rotary shaft 38.

In FIG. 1 a more specific example of the motor-gearbox elements will be described later. For the present, it is seen that the system 20 has the elements of enclosure 22 next to or near the switch 10 location, underground in this example. The motor 30 and gear unit 34 are whatever meets the speed, torque and other mechanical requirements of the switch 10. Because no adjustments in box 22 are contemplated after initial installation, it is unnecessary to have any access ports for a worker to set or reset anything.

The pot 36 is shown on motor shaft 32 in this example because that is a more direct and convenient location than is normally available on shaft 38. It is also likely to produce more accurate readings. It is arranged with the shaft 32 to develop a voltage varying according to the motor shaft position, which allows the position of shaft 38 and the closed or open position of the switch 10 to be determined, as will be described. A signal line 37 schematically in FIG. 1 represents an electrical connection from pot 36 to enclosure 24 carrying a switch position signal.

The second enclosure 24 of system 20 at the surface includes, in a first portion 40, the power supply for the motor 30, which depends on the motor requirements, e.g., AC line power, DC power developed from AC, DC battery power, or some combination. Single line 41 schematically represents an electrical power connection from the supply 40 to the motor 30. Enclosure 24 normally does not need hermetic sealing as is desired for box 22 in an underground location. (If the enclosure 24 is also underground, then sealing is of course required.)

The second enclosure 24 also includes a control portion 42 that can have electronic circuitry such as that similar to the existing automated motor operators described in the above mentioned Bulletin, for control of power to the motor 30, through power unit 40. As in the units of the Bulletin and other such equipment, the control unit 42 may be arranged for both local and remote operation, the latter through a radio and a Remote Terminal Unit (RTU). The control unit 42 also is electrically connected with a position switch panel 44 in enclosure 24 by circuitry represented by a single line 45. Panel 44 may sometimes be referred to as a "travel control panel". (Contents of an enclosure such as 24 may be referred to herein collectively as a "control and power supply assembly".)

One of the aspects of the arrangement of FIG. 1 is that a position signal from the pot 36 at the underground location is communicated to the above ground enclosure 24, here shown supplied by connection 37 to the position switch panel 44. For convenience in implementation, this example has the position signal on line 37 go to switch panel 44 which has its own electronic signal processor or microcontroller 870 (e.g., if preferred to keep control block 42 the same as in prior designs). As an option, the circuitry for signal processing functions in parts 42 and 44 could be combined in a single package.

More description of examples of the workings of control 42 and position switch panel 44 will be found below. FIG. 1 generally shows an arrangement of elements for a position signal from the pot 36 to be processed according to a worker's interaction at switch panel 44 to operate the motor 30; including the setting and adjusting of motor travel limits, without any need to access the underground enclosure 22. As mentioned FIG. 2 shows the alternate configurations of the power switch to which the present invention is applicable. The power switch configuration shown in FIG. 1, as mentioned, is applicable to the prior invention disclosed in the above-mentioned U.S. Pat. No. 7,122,986 B1

Figure 3:
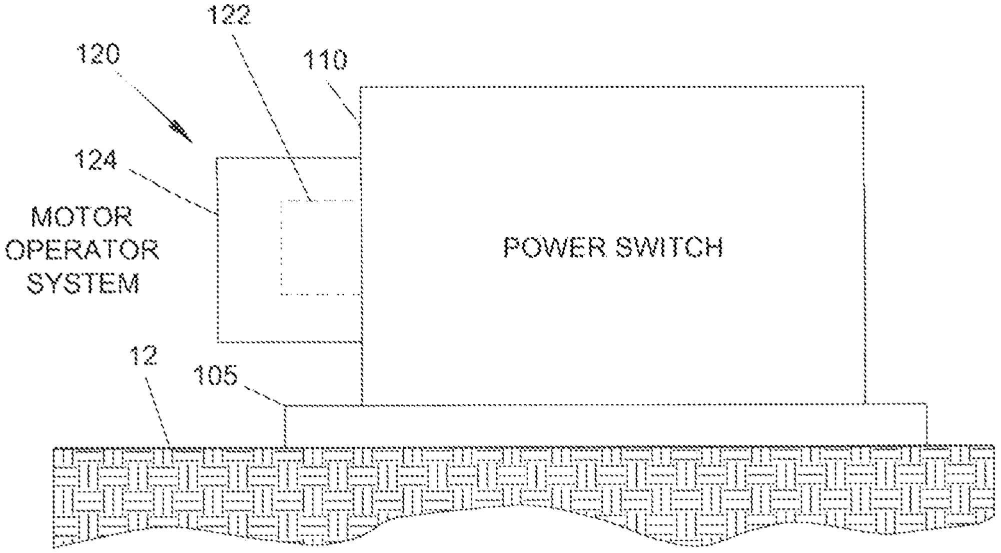
FIG. 3 is a schematic block diagram of another form of the innovative motor operator system of the present invention with a pad-mounted power switch.

In the drawing figures, examples of elements of similar character will normally have reference numerals with the same last two digits. FIG. 3 shows a pad mounted installation with a pad 105 on the ground 12 supporting a switch 110 and a motor operator system 120. Switch 110 can be of a type like switch 10 but the above ground location often allows use of an enclosed air break switch, one not hermetically sealed. The internal elements of switch 110 are generally as described for switch 10 in FIG. 2 with reference to the alternate switch configurations.

Motor operator system 120 could comprise two separate enclosures, like 22 and 24 in FIG. 1, but preferably has one enclosure 124 containing all the functional elements of the system 120, i.e., such elements as are exemplified by those in both boxes 22 and 24 discussed above. For one embodiment, as shown, the enclosure 124 houses the elements of box 24, and also, in a subenclosure 122 inside of box 124, those of box 22.

The apparatus depicted in FIG. 3 is to make clear the system elements for an underground installation can be readily applied to the pad-mounted installation, particularly because power switches 10 and 110 likely to be used in the two cases often have similar speed and torque requirements for the motor operators 20 and 120. It should still be appreciated that features of the invention, such as use of a rotary pot for generating a position signal that is used for setting or adjusting travel limits without accessing the enclosure 22 or 122, are broadly applicable to a motor operator for a switch in any location.

Figure 5:
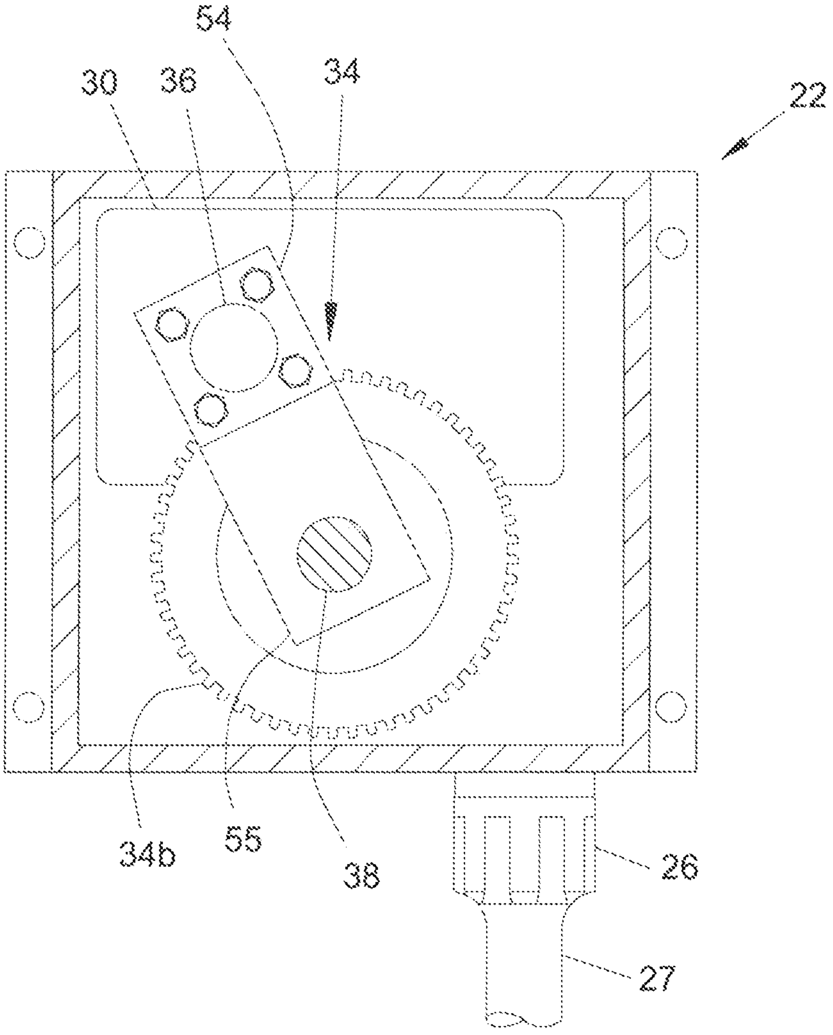
FIG. 5 is an end elevation view, partly in section, of the motor-gearbox of FIG. 4.

A more specific example of a motor-gearbox, such as box 22 of FIG. 1 or box 122 of FIG. 3, is shown in FIG. 4 and FIG. 5 which looks inside enclosure 22 as if a section is taken just past a sidewall on the side facing the viewer (i.e., element 22*d* of FIG. 5). FIG. 5 is a right end view taken just inside of the right cap (i.e., element 22*f* in FIG. 4). The relation of the sectioned and unsectioned elements will be apparent from the following description.

FIGS. 4 and 5 show a motor 30 which may be one that is commercially procured as a unitary motor and gear set. The motor 30, with whatever gearing accompanies it in the same unit from the motor manufacturer, may, but need not be one that by itself meets the mechanical requirements of a power switch it operates. For example, a motor 30 can be selected that can be coupled with a gear train 34 to achieve additional torsional output sufficient for power switches with which the motor-operator is to be used. The gear reduction of gearing 34 converts a higher speed, lower torque output of motor 30 on shaft 32 to a relatively lower speed, higher torque output on shaft 38. In this particular example, the gearing 34 includes a spur gear 34*a* running off the motor shaft 32 and a mating spur gear 34*b* on the output shaft 38. Each gear 34*a* and 34*b* has a tooth portion and a hub to the right of the tooth portion in FIG. 4.

FIG. 4 shows a rotary potentiometer 36 on the shaft 32 from motor unit 30 to develop the above-described motor position signal. The pot, in this embodiment, was selected to be a commercially available ten turn, I K. ohm potentiometer coupled to the shaft 32 by a slip clutch 50 to prevent damage that otherwise might occur if the pot reached its travel limits. The slip clutch 50 is further discussed in connection with FIG. 6. Also shown is a hexagonal coupler 60 and pointer 62, seal 28. A liquid tight cord grip 26 and a conduit 27 are provided for electrical conductors.

FIG. 5 also shows how the example motor unit 30 has its own housing of a substantially rectangular configuration. That is because it includes, in the example unit as procured, both a small DC permanent magnet motor and some gearing. The electric motor itself is not shown in FIG. 5 but is within the right hand portion of the unit 30. The shaft 32 (FIG. 4) comes out of the unit 30 in the left portion and comes directly through the first gear 34*a* of the gear train 34 to the pot 36.

Figure 6:
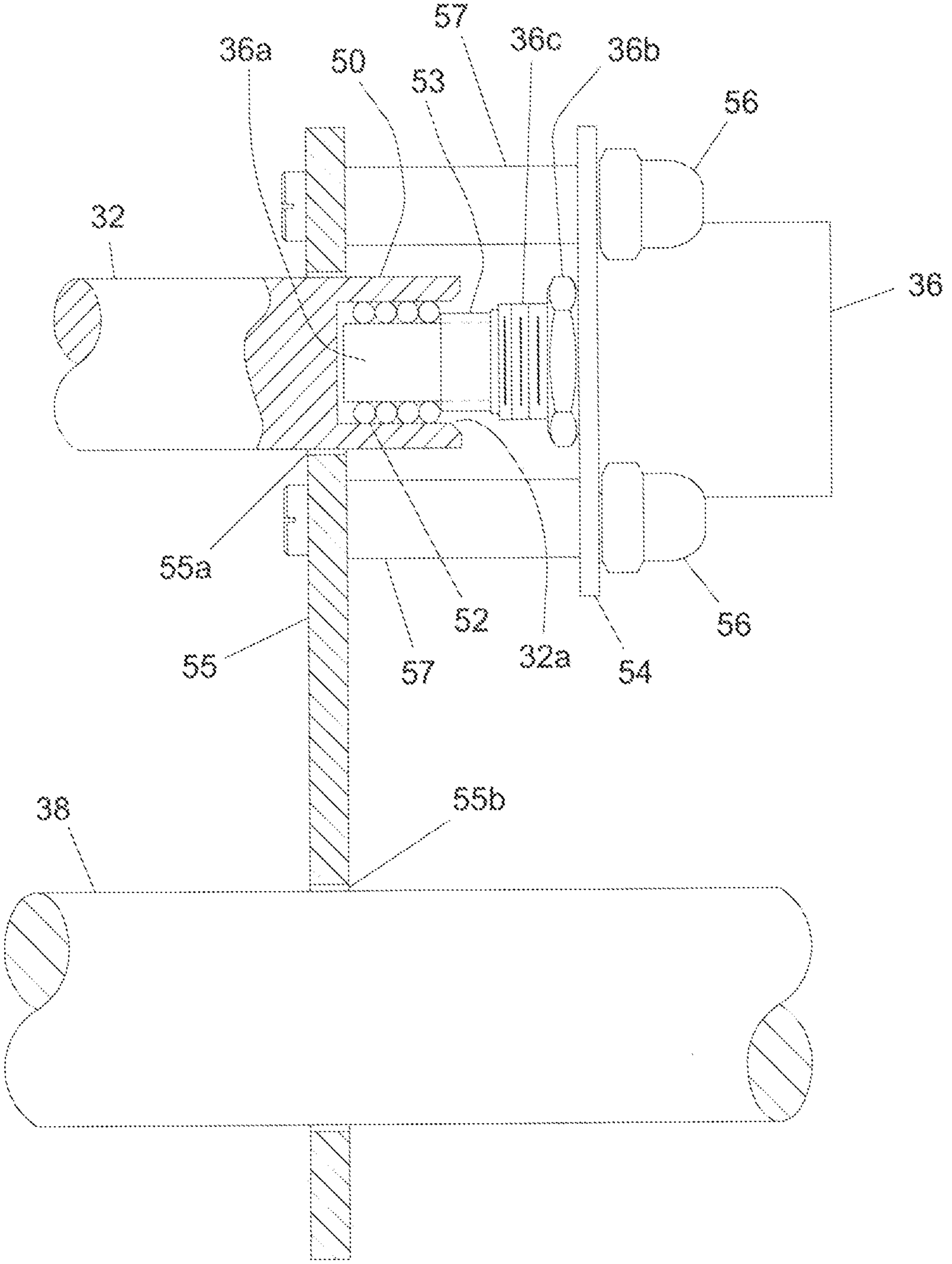
FIG. 6 is an enlarged view, partly in section, of part of the apparatus of FIG. 4.

FIG. 6 shows an enlarged view of an example pot 36 and slip clutch 50 that are assembled for use in a combination such as that of FIGS. 4 and 5. The rotary pot 36 requires a minimum force for accurate turning but has a certain stopper strength that may be exceeded by the torsion from the motor shaft 32. In that case the pot 36 would likely be destroyed at its end limits of travel if it had a solid connection with the motor shaft 32. The slip clutch 50 protects against such destruction. In the example of FIG. 6, a slip clutch 50 of simple parts and low expense is applied that serves the purpose well, although other forms of a slip clutch can also be used. A shaft 36*a* of pot 36 fits within a recess 32*a* of motor shaft 32 with O-rings 52 on the end of the pot shaft 36*a* and facing the wall of recess 32*a*, with no direct contact, axially or laterally, between the pot shaft 36*a* and the motor shaft 32. A spacer 53 helps keep O-rings 52 retained in alignment. For the particular case, the O-rings 52 are selected so the pot 36 turns steadily and safely for a predetermined number of turns, before slipping.

The pot 36 is mounted on a floating guide plate 54 by a nut 36*b* on a threaded part 36*c* surrounding the shaft 36*a*. The pot shaft 36*a* passes through a hole (not shown) in plate 54 that allows free rotation. The guide plate 54 is joined with another plate 55, sometimes called an anti-separation plate, which has apertures 55*a* and 55*b* for respective shafts 32 and 38. The plate 55 is not secured to any wall of the enclosure. Its apertures 55*a* and 55*b* allow free running of the shafts 32 and 38 without requiring lubrication or bearings but the plate 55 contributes to maintaining accurate alignment of the parts which otherwise could become distorted due to torsional effects. The floating guide plate 54, sometimes called a pot plate, is fastened to the other plate 55 by fasteners 56 and 57, 35 such as bolted standoff 57 from plate 55 with nuts 56, securing the pot plate. The nuts 56 allow air space so guide plate 54 is not solidly joined with the other plate 55. In this way, the shaft 32 is prevented from applying cantilevered forces that could cause undue wear or cause a change in the force to the pot resulting from the slip clutch 50.

One advantage of an assembly as shown in FIG. 5 and FIG. 6 is that the slip clutch 50 can be easily varied in its force limits by varying the number and size of the O-rings 52. That is, a design engineer may choose the motor 30 and pot 36 relatively independently and then devise a slip clutch 50 suitable for the choices made. In the illustrated example, four neoprene O-rings 52 are used in the slip clutch 50. The slip clutch 50 accurately transfers up to ten motor shaft rotations to the rotary pot and only slips at the end of ten rotations. The characteristics can be varied by altering, for example, the number, size or material of the O-rings and the space they occupy between the pot shaft 36*a* and the shaft bore 32*a*.

Figure 7:
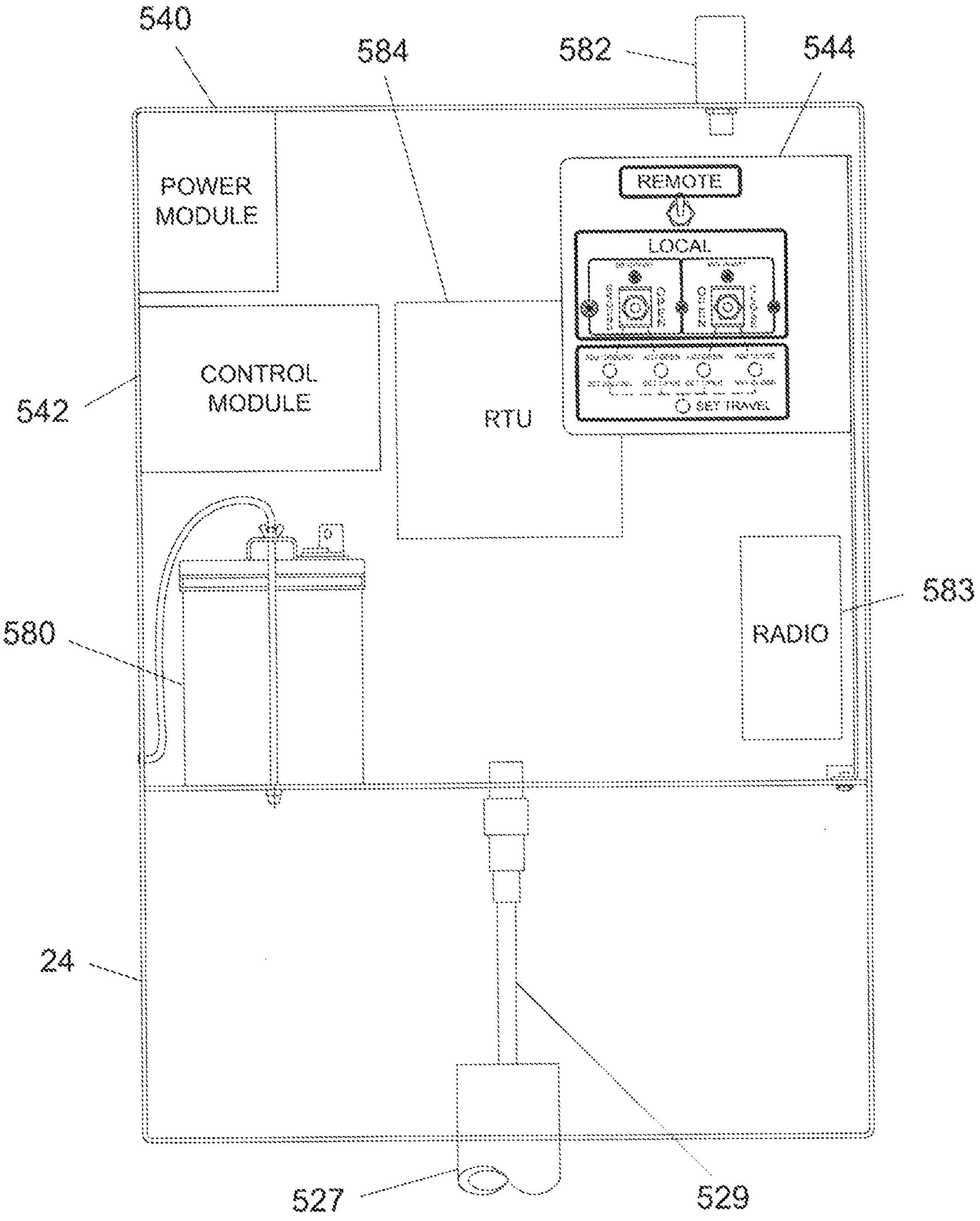
FIGS. 7 and 8 are front elevation views of different forms of control units for use with regard to the invention.
Figure 8:
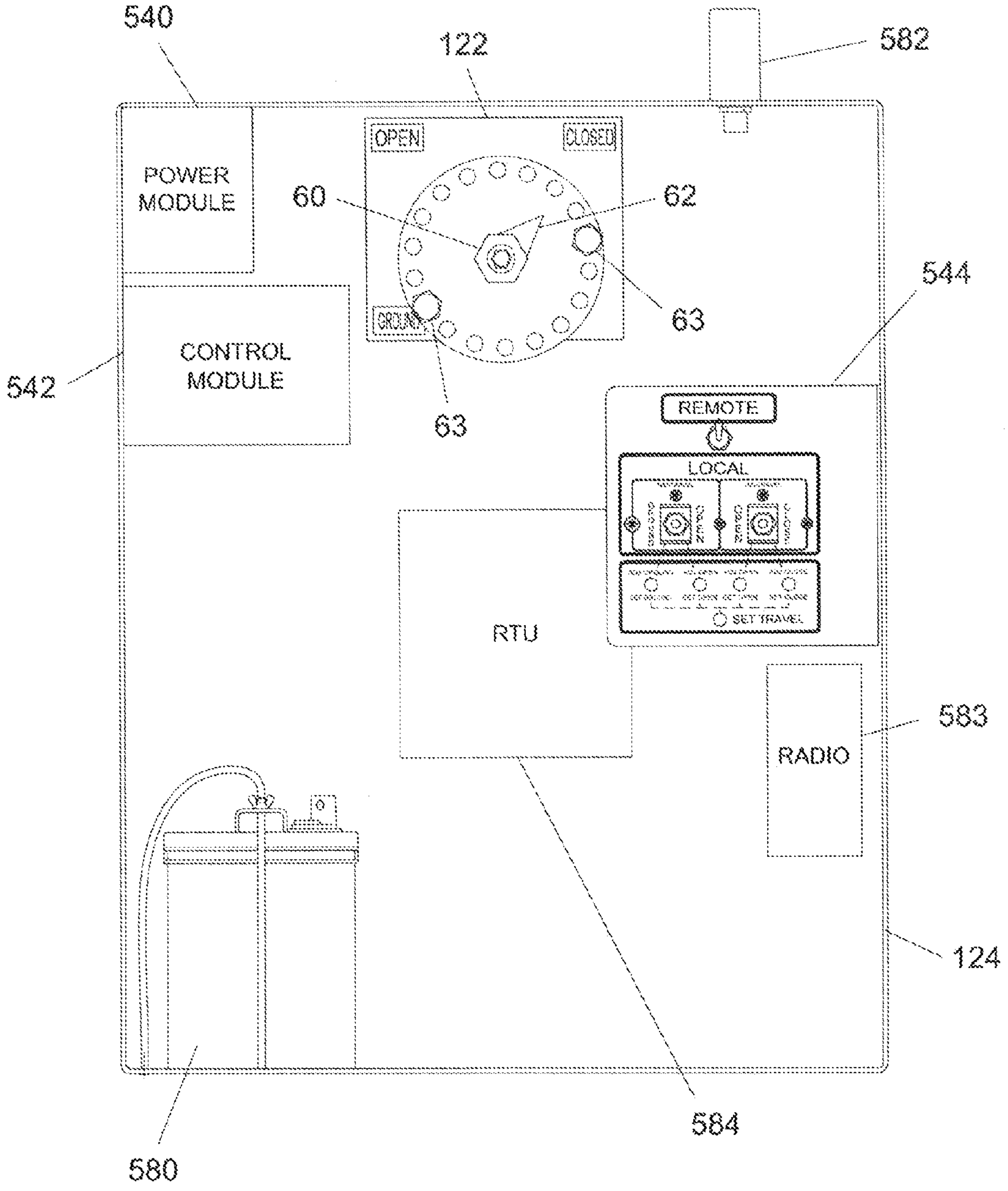
Figure 10:
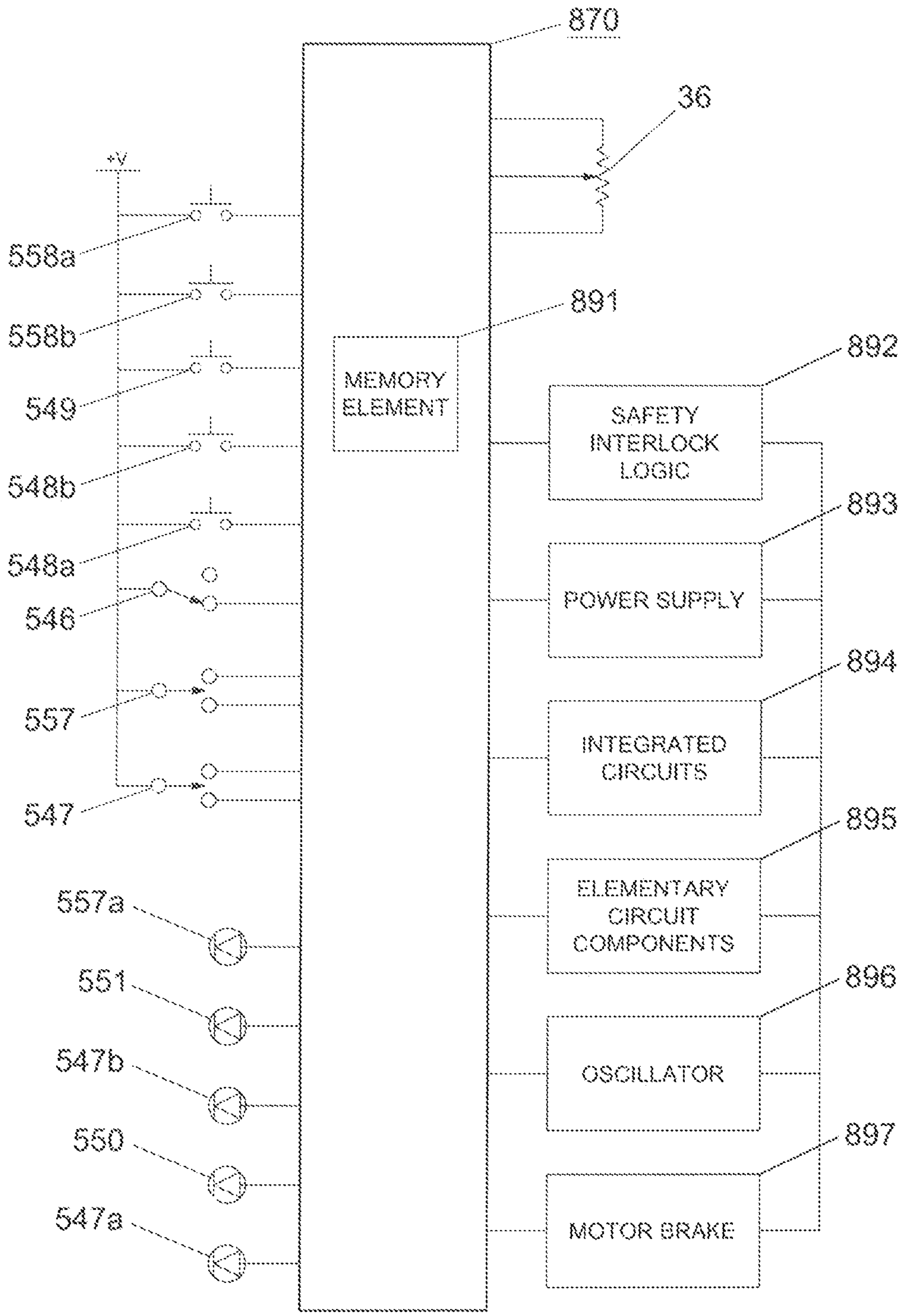
FIG. 10 is a schematic diagram of the arrangement of the microcontroller of the invention and its associated switches and other devices; and, FIG. 11 is a basic flow chart of the algorithm for the microcontroller with regard to the present invention.

FIGS. 7 and 8 illustrate, respectively, representative examples for power and control box 24 of FIG. 1 and the complete system box 124 of FIG. 3 which can be used in conjunction with either power switch configuration depicted in FIG. 2. They show how there can be much in common in motor operator systems for both underground and pad mounted installations. Each has a power module 540, in addition to a backup battery 580, a control module 542, and a position switch panel 544. In these examples, the switch panel 544 has its own microcontroller 870, as shown in FIG. 10, for processing position signals from the rotary pot in the motor-gearbox of the system. Both the units 24 and 124 are shown with a radio antenna 582 for a radio 583 and an RTU 584, which can be provided for remote operation. Except for the position switch panel 544 in each enclosure 24 and 124, and a motor gear box 122 as shown in FIG. 8, design for the mentioned elements can be substantially like prior technology, such as the automated motor operators described in the above mentioned Bulletin. Wiring for the elements in the units 24 and 124 in FIGS. 7 and 8 is not fully shown. Each such unit will typically have additional elements not shown here, such as a thermostat controlled heater and fuses, as in the equipment in the Bulletin. Merely as examples, units 24 and 124 can each be of a size about 21 in. wide by 29 in. by 15 in. deep. FIGS. 7 and 8 show units 24 and 124 without the usually present gasketed and lockable doors that provide weather resistance and security.

In FIG. 7, there is a conduit 527 through the bottom wall of the enclosure 24 for conductors 529 to an exterior motor-gearbox 22, such as like that shown in FIGS. 1, 4 and 5, that could be at the underground location. In FIG. 8, the otherwise similar enclosure 124 has a motor-gearbox 122 on the back wall of the enclosure 124 for mechanical coupling to a pad-mounted power switch (like 110 in FIG. 3). FIG. 8 gives an idea of the convenience afforded by a compact motor-gearbox 122 that can be applied with some versatility for different applications.

The end view of motor gear box 122 in FIG. 8 is the left end of the unit 22 in FIG. 4, showing a direct view of the hexagonal coupler 60 and pointer 62. Also shown is a locking disk with a pair of stop bolts 63 that set the farthest limits of the movement of the output shaft, under either motor operation or manual operation. That can be important during a manual operation or if the motor operator malfunctions.

Figure 9:
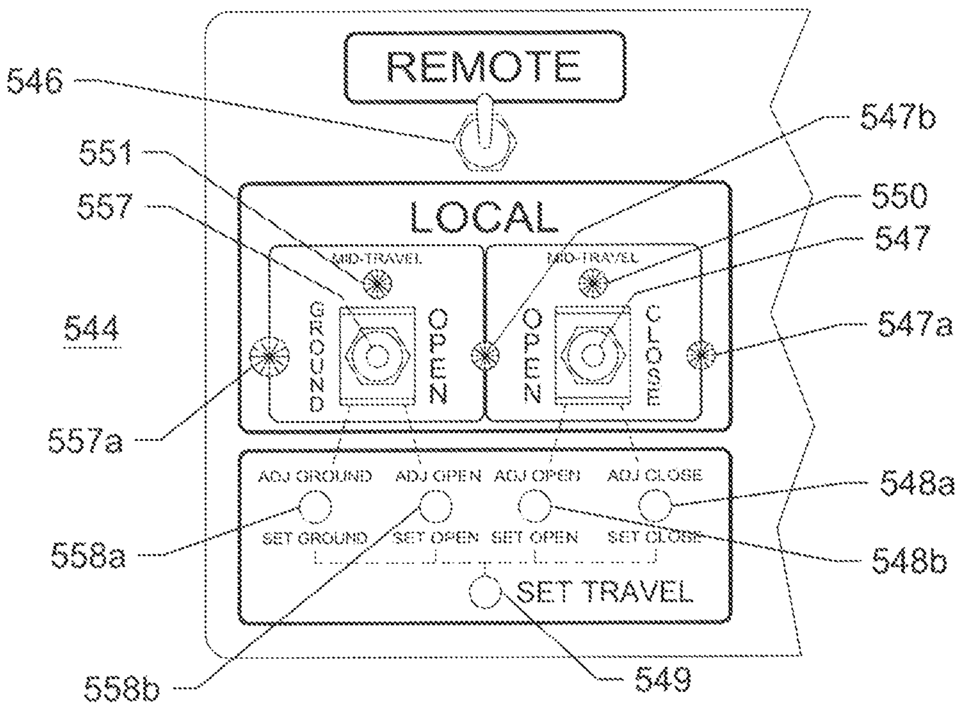
FIG. 9 is an enlarged front elevational view of part of the apparatus of FIGS. 7 and 8 for setting travel limits.

FIG. 9 shows an enlarged view of a position switch panel 544 suitable for use in FIGS. 7 and 8. Preliminarily, it is to be recognized the setting of travel limits with the present invention can achieve results like prior art arrangements, such as with limit switches, but in a much more convenient way and without concern about limit switch wear. In general, a worker performing hand operations at a switch panel 544 and seeing, hearing or otherwise being informed (such as by a co-worker) of a switch tripping to an open position or a dosed position, is highly effective, simple and convenient. The particular example only requires a sensor to give a position signal (without, for example, other sensors for motor current, speed, or other parameters, at least some of which are susceptible to variation due to temperature changes) and only requires a controller that needs to process that single sensed signal to effect a desired travel setting or adjustment to operate the power switch with complete travel. So the result in the particular example system is one that utilizes microprocessor technology in a simple, sure and dependable way with human judgment as a final determinant of achieving a desired result. Also, the particular technique is one that is equally effective whether or not the switch operating mechanism includes an energy storage spring, or the like. Even if the motor shaft 32 or output shaft 38 of FIG. 4 is not producing any movement of a switch contact 15 of FIG. 2 during part of its travel, while a spring is being wound, the worker just needs to determine (and the control to know in its memory) whether the result of the motor operation is successful in fully moving the power switch to its desired position. In the case of an enclosed switch, such as in an underground installation, it is helpful that the switch have a spring for a positive indication of when it trips to either the open or closed state.

In FIG. 9, the example position switch panel 544, for use in either unit 24 of FIG. 7 or unit 124 of FIG. 8, has a first switch 546 for switching between remote operation (shown here) and local operation. Panel 544 also has an OPEN-CLOSE toggle switch 547 which has an unlabeled center off position and also a GROUND-OPEN toggle switch 557 which also has an unlabeled center off position for the GROUND OPEN CLOSE CONFIGURATION of power switch 10 shown in FIG. 2. For the alternative CLOSE OPEN CLOSE CONFIGURATION of power switch 10 shown in FIG. 2 the toggle switch 557 is CLOSE-OPEN and also has an unlabeled off position (this form of the toggle switch 557 is not shown in the drawings, but GROUND is simply replaced with a second CLOSE position). Indicator lights 547*a* and 547*b* are respectively shown by the labels of close and open positions for switch 547. Typically, light 547*a* is red and light 547*b* is green. The switch 547 can be toggled to a desired position and then released. In a like manner the switch 557 can be toggled to GROUND where indicator light 557*a* is yellow, for example. When switch 557 is toggled to the open position the indicator light 547*b* is green. In addition, a SET TRAVEL portion of the panel 544 has a first push button switch 548*a* (e.g., with a red top), a second pushbutton switch 548*b* (e.g., with a green top), and a third pushbutton switch 549 (e.g., with a black top). By the dashed lines from each of switches 548*a* and 548*b* to the OPEN-CLOSE switch 547 and to switch 549 (referred to as the SET button), along with the displayed legends “ADJ CLOSE”, “ADJ OPEN”, “SET CLOSE”, and “SET OPEN”, a worker can readily see which switches are used together for travel limit settings and adjustments. Although not so labeled on FIG. 11, switches 548*a*, 548*b*, and 549 may sometimes be referred to in the following description as the first CLOSE, OPEN, and SET pushbuttons, respectively. In addition, the SET TRAVEL portion of the panel 544 also has a fourth push button switch 558*a* (e.g., with a yellow top), a fifth pushbutton switch 558*b* (e.g., with a green top), and the third pushbutton switch 549 (e.g., with a black top) also works in conjunction with these switches. By the dashed lines from each of switches 558*a* and 558*b* to the GROUND-OPEN switch 557 and to switch 549 (referred to as the SET button), along with the displayed legends “ADJ GROUND”, “ADJ OPEN”, “SET GROUND”, and “SET OPEN”, a worker can readily see which switches are used together for travel limit settings and adjustments. Although not so labeled on FIG. 9, switches 558*a*, 585*b*, and 549 may sometimes be referred to in the following description as the GROUND, OPEN, and SET pushbuttons, respectively. In the case GROUND is replaced with a SECOND CLOSE configuration for the non-grounded switch configuration shown in FIG. 2 the “ADJ GROUND” switch 558*a* and “SET GROUND” designation would be changed to “ADJ CLOSE” and “SET CLOSE” respectively (not shown in the drawings).

The switches 546, 547, 548*a*, 548*b*, 549, 557, 558*a*, 558*b* and lights 547*a*, 547*b*, and 557*a* are all interconnected behind the front of panel 544 with microcontroller 870 (shown schematically in FIG. 10) that is further interconnected with the control module 542 of the units of FIG. 7 or 8. In addition MID-TRAVEL lights 550 and 551 are provided to indicate to the worker that the power switch 10 is in a MID-TRAVEL (when the light is on) position for respectively movement between GROUND AND OPEN and vice versa and between OPEN and CLOSE AND vice versa. These lights are also interconnected behind the front of panel 544 with the microcontroller 870 (shown schematically in FIG. 10). The microcontroller 870 of panel 544 includes a circuit portion to convert an analog pot signal to a digital signal and to use the digital signal in a programmed microprocessor to process the pot signal in accordance with settings and other data of a memory element 891 (e.g., comparison of a present position with the last set position), all consistent with general microcontroller practice but here specifically programmed and arranged for operations and adjustments according to worker interaction with the switches on the panel 544. The arrangement of such a microcontroller 870 of the present invention is shown in FIG. 10 with a basic flowchart of the software algorithm of the microcontroller 870 shown FIG. 11. Microcontrollers with sufficient input and output connections for the panel 544 that include an analog to digital converter and an EEPROM type of memory are widely available and their programming and general methods of use are well known.

In order to set positions, a combination of buttons is used to indicate to the electronics that a particular voltage is developed by the potentiometer 36 of FIG. 4 is the desired set point. For example, to set the OPEN position the worker would depress the SET TRAVEL button 549 and SET OPEN button 558*b* for approximately two seconds. The OPEN light 547*b* will blink indicating that the position has been set and this voltage set point is saved to non-volatile memory in the memory element 891. This process is repeated for each set point. This novel approach is accomplished by the position switch panel 544 indicating clockwise or counterclockwise rotation of the motor 30 based on the present position and recording the four positions in memory element 891. The set positions are only adjustable locally while the REMOTE/LOCAL switch 546 is in the LOCAL position. This prevents the points from being adjusted remotely while there is no personnel at the high voltage power switch location to confirm proper operation. The MIDTRAVEL lights 550, 551 indicate to the user locally at the display panel and remotely through supervisory control that the high voltage power switch is in between positions. This allows the worker to always know the position of the attached electric motor and switch. In order to retrofit present invention to the invention disclosed in the above-mentioned U.S. Pat. No. 7,122,986 B1, a change of all control electronics and motor is required in order to operate a different power switch that has a ground position or double-throw position.

FIG. 10 shows the arrangement schematically of a basic view of the microcontroller 870 of the present invention and its associated switches and devices including memory element 891, position indicating lights i.e., light emitting diodes 557*a*, 551, 547*b*, 550, 547*a*, also, switches 558*a*, 558*b*, 549, 548*b*, 548*a*, 546, 557, 547, safety interlock logic 892, power supply 893, integrated circuits 894, elementary circuit components 895, oscillators 896, and motor brake 897. Additionally potentiometer 36 is shown and its connection to the microcontroller 870. Not shown in detail is the additional safety interlock logic 892, power supply 893, oscillators 896, integrated circuits 894, motor brake 897, and various elementary circuit components 895 required for a robust circuit design. As previously detailed the toggle switch for GROUND OPEN 557 and OPEN CLOSE 547 use both poles connected to the microcontroller 870, as it is important to know when the switch is in either position. The REMOTE LOCAL 546 switch is only required to know if it is in either the REMOTE or LOCAL position, so only one connection is required to the microcontroller 870. Each of the pushbutton switches for SET GROUND 558*a*, SET OPEN 558*b*, SET OPEN 548*b*, SET CLOSE 548*a*, and SET TRAVEL 549 are shown as single pole normally open pushbuttons each with individual connection to the microcontroller 870. The status lights GROUND 557*a*, OPEN 547*b*, CLOSE 547*a*, MID-TRAVEL GROUND 551, and MID-TRAVEL CLOSE 550 are shown as individually connecting to the microcontroller 870.

Figure 11:
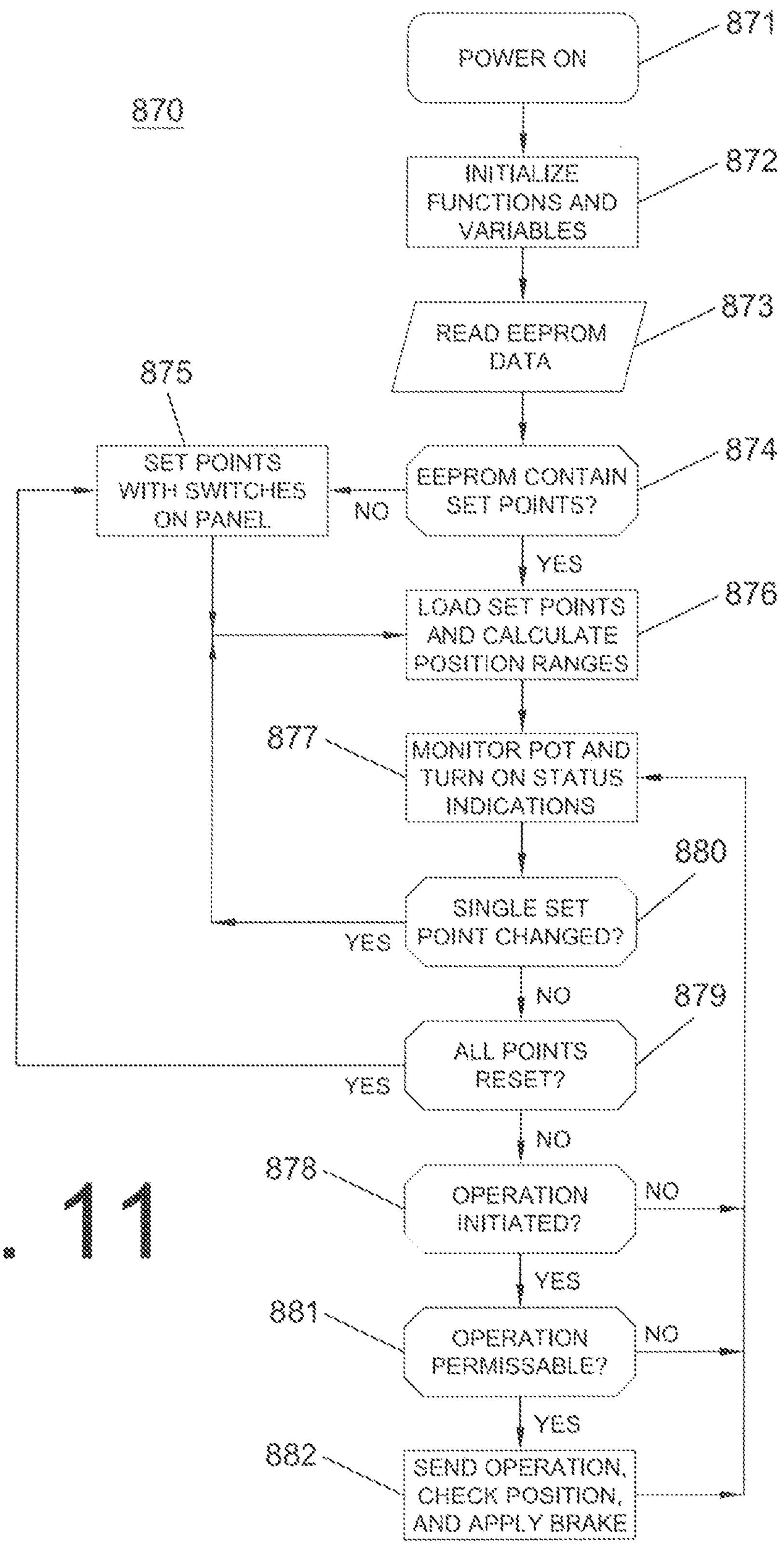

FIG. 11 is a basic flowchart of the software for the microcontroller 870 referred to in FIG. 10 which includes in block 871 a Power-on detection state. In block 872 the variables/Timers/Analog Functions are initialized. In block 873 the data from the above-mentioned EEPROM is read. In block 874 a determination is made of whether or not the data indicates pre-defined setpoints. If Yes, in block 876 the setpoints are loaded into position data and position ranges for the power switch 10 are calculated. In block 877 the analog position of the motor 30 is monitored and correct status points are turned on. In block 878, a determination is made as to whether a remote or local operation has been initiated, if No, a signal is again sent to block 877. In block 879, a determination is made as to whether a point Clear/reset has been performed, if yes block 875 determines if points have been manually set. If no, block 875 is activated again, if yes, block 876 is activated. Block 880, determines if a point has been adjusted or reset, if yes, block 876 is activated, if no, block 877 is activated. Also, in block 878 if a remote or local operation has been initiated then block 881 determines if the operation is permissible. If no, block 877 is activated, if yes, block 882 is activated which Sends operation/monitors position/applies brake.

To perform functions at the panel 544, in accordance with this example, a worker first needs to set the REMOTE/LOCAL switch 546 to LOCAL. Then various options are available. Operating just the switch 547 to OPEN or CLOSE will cause the motor 30 (as well as the motor-gearbox output shaft 38) to move from its current position to the corresponding position indicated on the toggle switch, according to the position settings in the memory of the microcontroller, for example. When a switch 10 and a motor operator system 20 or 120 are first installed and set up for operation, a suitable set up procedure can include:

Manually closing the switch 10;

Attaching the motor-gearbox 22 or 122 to the switch 10; applying battery power to the motor-gearbox, without any AC line power to the switch or its operator, resulting in a position signal to the controller indicating a closed position;

Setting the closed position as a travel limit at the panel 544;

Manually operating the motor-gearbox to move the switch to the open position;

Setting the open position as a travel limit at the panel 544;

Manually operating the motor-gearbox to move the switch to the ground position;

Setting the ground position as a travel limit at the panel 544;

Manually operating the motor-gearbox to move the switch back to the open position; and, Setting the open position as a travel limit at the panel 544. Without any further manual operations at the switch location, the travel limits can be tested and adjusted as desired at the panel 544. For example, the original set points upon completing an installation procedure as described above may be altered a little, to a more closed or more ground or more open position, if desired. That could prepare a spring loaded switch operating mechanism for more sure operation.

More specifically with respect to the particular panel 544, in order to set a current location of the motor as the OPEN or CLOSE position, the worker holds down the SET pushbutton

549 while also pressing the corresponding OPEN push button on 548*b* or CLOSE push button 548*a* (briefly, e.g., 2-3 secs.). In either case, the corresponding light 547*a* or 547*b* will blink showing that the point has been set, i.e., recorded in the memory of the microcontroller of the panel 544 and the pushbuttons are released. Subsequent operation, either remote or local, will occur according to that position 10 until there is a further adjustment.

If the worker wants to adjust a present OPEN or CLOSE set point, either the OPEN button 548*b* or the CLOSE button 548*a* is held down while moving the switch 547 to the OPEN or CLOSE direction as the case may be, without operating the SET pushbutton 549. If the worker wants to adjust a present GROUND or OPEN set point either the OPEN button 558*b* or the GROUND button 558*a* is held down while moving the switch 557 to the OPEN or GROUND directions as the case may be, without operating the SET pushbutton 549.

The panel 544, in this example, is programmed to effect a specific increment of motor motion (i.e., motor-gearbox output shaft) on each such operation. For example, the motor output shaft 38 of unit 22 will move 3 degrees toward a more open or more closed position. If the worker is then satisfied that the position reached is what is desired (e.g., by hearing or otherwise observing the switch 10 has opened or closed), and does not perform another operation, then the position reached will become the set position. Otherwise the worker 25 continues with one or more other ADJ OPEN or ADJ CLOSE operations or ADJ GROUND or ADJ OPEN operations. If the worker finds the predetermined increment is too much, a reverse operation is performed to back up. The MID-TRAVEL light 550 lights when the power switch 10 is between the OPEN-CLOSE setpoints and the MID-TRAVEL light 551 lights when power switch 10 is between the GROUND-OPEN setpoints. If the system hits a mechanical stop during adjustment in any direction and is unable to complete the increment of travel, the worker waits a few seconds while the microcontroller times out and the limit reverts to the last setting. In all these instances, the software running on the microcontroller produces the desired functions, in response to the worker's operation of the position switches, while taking advantage of the precise position signal produced by the potentiometer (e.g., pot 36) and recorded in the microcontroller.

By way of further example, the microcontroller of described panel 544 could be replaced by circuitry including discrete logic elements, counters, comparators, etc. The position switch panel 544 switches can all be varied in type and location, and their legends, as could the lights. For example, a worker could interact with the circuitry that receives the signal from the position sensor by some alphanumeric keyboard or by touching, directly or by a cursor on a computer video monitor, elements of a display. Furthermore, any or all such elements of a panel 544 or its alternatives can be more intimately combined, than shown in the illustrated embodiments, with elements that perform the functions of the power module 540 or 40 and the control module 542 or 42.

Additional elements of a motor operator system with one or more features of the invention would normally include one or more brackets for physical support of the motor-gearbox with the switch so the unit stays in position despite the forces on it during switch operations. Also, a mechanical coupler-decoupler, indicated generally as element 19 in FIG. 1, is further provided for decoupling the motor-gear box output shaft from the power switch, such as for occasions for routine tests of the motor without disturbing the switch position. Such features can be provided in suitable forms in accordance with past practice and are not detailed further in this description.

In its broader aspects, use of a potentiometer for position signals may take other forms from that of a rotary pot and slip clutch on a motor shaft as shown here. The arrangement shown has simplicity and effectiveness. Other potentiometers are also suitable for achieving a motor position signal that is reliably renewed after a power outage. Shaft position encoders that are hall effect devices or optical sensors are not able to do so. That is also the case with other 2-phase encoders, sometimes referred to as relative position sensors, in contrast to absolute position sensors which in addition to a pot, include absolute encoders (mechanical or optical) and a "Selsyn" resolver, for example.

It is advantageous to have a position sensor that is of the type characterized by an ability to resume generating an accurate position signal upon restoration of power following a loss of power to the control circuit and motor drive. A loss of power to the device, in this context, means a total loss of power; both the AC line power and any backup (e.g., battery) power are out. The ability to resume generating an accurate position signal means the position signal from the position sensor indicates the actual position of the drive, regardless of any drive movement during the time the power is off. Absent that ability, a motor operator system faces a problem because, even with a nonvolatile memory in the controller storing predetermined travel limit, the motor operator may have moved during the power outage, such as by an actual, or a merely attempted, manual operation. Such movement makes the output from a relative position encoder, after power is restored, not accurate and not useful for the controller, so a repeat of a procedure like that used when the motor operator is first installed with the switch may be necessary. In the case of position sensors that have the described ability, e.g., potentiometers and absolute encoders, a signal is generated immediately upon power being restored that is accurate, even if such movement has occurred. The embodiments disclosed are merely some examples of the various ways in which the invention can be practiced. The present invention allows the travel set features to be applied to complex power switches that have a ground position contact or a double-throw contact.

What is claimed is:

1. A power switch motor operator system for a power switch with ground contact position or of the double-throw type comprising:

a motor with a motor shaft arranged for mechanical coupling to a movable contact of a power switch;

a power supply and control assembly electrically connected to the motor for operation of the motor;

a potentiometer arranged to develop a voltage indicating the rotary position of the motor shaft and to communicate a signal representing that voltage to a microcontroller including a memory element;

a position switch panel that electrically communicates with the power supply and control assembly and includes switches for setting and adjusting travel limits for the motor shaft to a power switch first CLOSE position, a power switch OPEN position, and a power switch GROUND position or second CLOSE position via the microcontroller using the signal from the potentiometer without requiring access to the motor which may be located in a switch vault;

wherein the position switch panel includes switches for selectively directing motor and power switch movement in a power switch first CLOSE direction, directing movement in a power switch OPEN direction, directing movement in a power switch GROUND direction or second CLOSE direction, setting the power switch first CLOSE position in a memory element and setting the power switch OPEN position in the memory element and setting the power switch GROUND position or the power switch second CLOSE position in the memory element.

2. The system of claim 1 further comprising: a slip clutch between the motor shaft and the potentiometer.

3. The system of claim 2 where: the slip clutch comprises a number of O-rings that allow motor shaft motion to be transferred to the potentiometer while limiting torsion on the potentiometer.

4. The system of claim 1 where: the motor is sealed for use in underground and flooded locations and is located in a switch underground vault.

5. The system of claim 2, wherein the potentiometer is a rotary potentiometer.

6. The system of claim 1 where:

the position switch panel also includes a first adjusting switch for use together with an OPEN switch to advance the motor an increment of motion in the OPEN direction, on each operation of the first adjusting switch and the OPEN switch, and a second adjusting switch for use together with a first CLOSE switch to advance the motor an increment of motion in the first CLOSE direction, on each operation of the second adjusting switch and the first CLOSE switch, third adjusting switch for use together with a second OPEN switch to advance the motor an increment of motion in the OPEN direction, on each operation of the third adjusting switch and the second OPEN switch, and a fourth adjusting switch for use together with a GROUND switch or a second CLOSE switch to advance the motor an increment of motion in the GROUND direction or CLOSE direction.

7. The system of claim 4 where:

the motor is installed in an underground location near a power switch the system operates;

the power supply and control assembly is installed at an above ground or underground location and electrical conductors are connected between the motor and power supply and control assembly.

8. The system of claim of 7, including a gear train running on the motor shaft, and an output shaft from the gear train having an end extending from the first enclosure arranged for mechanical coupling to a movable contact of the power switch.

9. The system of claim 8 where:

the output shaft from the gear train of the first enclosure allows manual operation of a power switch with the motor deenergized.

10. The system of claim 5 where:

the rotary potentiometer is mechanically coupled to an end of the motor shaft through the slip clutch.

11. The system of claim 1 where:

the motor and motor shaft and the potentiometer are housed in a first enclosure and the power supply and control assembly and the position switch panel are housed in a second enclosure.

12. Apparatus comprising a motor operator system in accordance with claim 1 in combination with a power switch where:

the power switch includes a movable contact for connection to a first CLOSE position, an OPEN position and a GROUND position or second CLOSE position, the motor shaft is mechanically coupled to the movable contact of the power switch.

13. The apparatus of claim 12 where:

the power switch is selected from the group consisting essentially of vacuum switches, gas-insulated switches, and enclosed air-break switches.

14. The apparatus of claim 12 where:

the combination of the power switch and the motor and motor shaft and the potentiometer is located in an underground vault and the power switch is either a vacuum switch or a gas-insulated switch.

15. The apparatus of claim 12, where the combination of the power switch and the motor and motor shaft and potentiometer is located at ground level and the power switch is an enclosed air break switch.

* * * * *